United States Patent
Beals et al.

(10) Patent No.: US 9,043,902 B2
(45) Date of Patent: *May 26, 2015

(54) APPARATUS FOR CONTROLLING PROCESSOR EXECUTION IN A SECURE ENVIRONMENT

(71) Applicant: Nagrastar LLC, Englewood, CO (US)

(72) Inventors: William Michael Beals, Englewood, CO (US); Nicolas Fischer, Versoix (CH); Benjamin Brian Ellis, Denver, CO (US)

(73) Assignee: Nagrastar, LLC, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/026,143

(22) Filed: Sep. 13, 2013

(65) Prior Publication Data

US 2014/0033297 A1 Jan. 30, 2014

Related U.S. Application Data

(63) Continuation of application No. 12/117,571, filed on May 8, 2008, now Pat. No. 8,613,081.

(60) Provisional application No. 60/917,582, filed on May 11, 2007.

(51) Int. Cl.
| | |
|---|---|
| *G06F 21/00* | (2013.01) |
| *G06F 21/71* | (2013.01) |
| *G06F 21/51* | (2013.01) |
| *G06F 21/85* | (2013.01) |

(52) U.S. Cl.
CPC ............... *G06F 21/71* (2013.01); *G06F 21/51* (2013.01); *G06F 21/85* (2013.01); *G06F 2221/2143* (2013.01)

(58) Field of Classification Search
USPC ............... 726/21, 34; 713/163, 164, 189, 190
See application file for complete search history.

(56) References Cited

U.S. PATENT DOCUMENTS

| 6,832,378 B1 | 12/2004 | Beatty, III et al. |
| 7,730,318 B2 | 6/2010 | Kurien et al. |

(Continued)

FOREIGN PATENT DOCUMENTS

| EP | 1619572 | 1/2006 |
| GB | 2402785 | 12/2004 |

(Continued)

OTHER PUBLICATIONS

Canadian Office Action in Application 2685058, mailed Jul. 5, 2012, 2 pgs.

(Continued)

*Primary Examiner* — Jason Lee
(74) *Attorney, Agent, or Firm* — Merchant & Gould P.C.

(57) ABSTRACT

Various embodiments described herein relate to apparatus for executing software in a secure computing environment. A secure processor can be used and configured to request a context swap from a first context to a second context when switching execution from a first portion of software to a second portion of software. A context manager, which can be in communication with the secure processor, can be configured to receive and initiate a requested context swap. A trust vector verifier, which can be in communication with the secure processor and the context manager, can be configured to load a trust vector descriptor upon command from a context manager.

20 Claims, 7 Drawing Sheets

(56) References Cited

U.S. PATENT DOCUMENTS

| | | | |
|---|---|---|---|
| 8,220,045 B2* | 7/2012 | Conti et al. | 726/17 |
| 2003/0140245 A1* | 7/2003 | Dahan et al. | 713/200 |
| 2003/0221030 A1 | 11/2003 | Pontius et al. | |
| 2004/0003277 A1* | 1/2004 | Rabeler | 713/200 |
| 2004/0139346 A1 | 7/2004 | Watt et al. | |
| 2004/0148480 A1 | 7/2004 | Watt et al. | |
| 2005/0228916 A1 | 10/2005 | Telesco | |
| 2006/0015748 A1* | 1/2006 | Goto et al. | 713/190 |

FOREIGN PATENT DOCUMENTS

| | | |
|---|---|---|
| JP | 05-298119 A | 11/1993 |
| JP | 2002-535757 A | 3/2002 |
| TW | 200617675 A | 1/2006 |
| TW | 200636488 A | 10/2006 |
| WO | WO 00/43855 | 7/2000 |
| WO | WO 2004/107181 | 12/2004 |

OTHER PUBLICATIONS

Chinese 2$^{nd}$ Office Action in Application 200880015564.5, mailed Nov. 22, 2011, 25 pgs.

Chinese 3$^{rd}$ Office Action in Application 200880015564.5, mailed Feb. 29, 2012, 3 pgs.

Chinese First Office Action; Chinese Application No. 200880015564.5, mailed May 31, 2011, with English translation, 7 pages.

Chinese Notice of Allowance in Chinese Application 200880015564.5, mailed Feb. 17, 2013, 2 pgs. (no English translation).

Digital Signature Standard (DSS), Federal Information Processing Standard Publication 186, May 19, 1994, National Institute of Standards and Technology, Gaithersburg, United States.

European Application 08747865.7, Summons to Attend Oral Proceedings Pursuant to Rule 115(1) EPC, Aug. 7, 2013, 9 pages.

European Application 09175715.3, Intent to Grant filed Aug. 22, 2013, 37 pages.

European Application 13001523.3, Search Report dated Jul. 19, 2013, 6 pages.

European Communication in Application 09175715.3, mailed Nov. 12, 2012, 4 pgs.

European Extended Search Report in Application 09175715.3, mailed Nov. 12, 2012, 4 pgs.

European Office Action in Application 08747865.7, mailed Mar. 25, 2011, 8 pgs.

European Search Report in Application 8747865.7, mailed May 22, 2009, 5 pgs.

International Search Report for PCT Application PCT/US2008/063089, mailed on Mar. 4, 2009.

Japanese Decision to Grant in Application 2010507668, mailed Apr. 24, 2012, 3pgs.

Japanese Notice of Rejection in Application 2010507668, mailed Dec. 20, 2011, 3 pgs.

Korean Notice of allowance in Application 1020097023525, mailed May 31, 2011, 2 pgs.

Korean Preliminary Rejection in Application 1020097023525, mailed Mar. 14, 2011, 4 pgs.

Lie, David et al., Architectural Support for Copy and Tamer Resistant Software, ACM SIGARCH Computer Architecture News, Dec. 2000, pp. 168-177, vol. 28, Issues 5, ACM, New York City, United States.

U.S. Appl. No. 12/117,571, Amendment and Response filed Jun. 27, 2011, 12 pages.

U.S. Appl. No. 12/117,571, Amendment and Response filed Dec. 13, 2011, 14 pages.

U.S. Appl. No. 12/117,571, Final Office Action mailed Sep. 13, 2011, 43 pages.

U.S. Appl. No. 12/117,571, Non-Final Office Action mailed Mar. 25, 2011, 30 pages.

U.S. Appl. No. 12/117,571, Notice of Allowance mailed Aug. 19, 2013, 16 pages.

Canadian Office Action in Application 2685058, mailed Jan. 27, 2014, 2 pages.

European Communication in Application No. 087478657, mailed Dec. 6, 2013, 12 pages.

European Office Action Minutes of Oral Proceeding in Application No. 087478657, mailed Jan. 3, 2014, 28 pages.

European Intent to Grant in Application No. 087478657, mailed Jan. 20, 2014, 6 pages.

European Intent to Grant in Application No. 130015233, mailed Jun. 23, 2014, 7 pages.

Taiwan Office Action in Application No. 097117382, mailed Nov. 1, 2013, 6 pages (English Translation).

Taiwan Notice of Allowance in Application No. 097117382, mailed Aug. 14, 2014, 3 pages.

Canadian Patent Application No. 2,685,058, Office Action mailed Feb. 9, 2015, 4 pages.

* cited by examiner

APPARATUS FOR CONTROLLING PROCESSOR EXECUTION IN A SECURE ENVIRONMENT

RELATED APPLICATIONS

This application is a continuation of and claims benefit to U.S. Pat. No. 8,613,081, entitled "APPARATUS FOR CONTROLLING PROCESSOR EXECUTION IN A SECURE ENVIRONMENT," filed on May 8, 2008, which claims the benefit of U.S. Provisional Application No. 60/917,582, entitled "APPARATUS, SYSTEM AND METHOD FOR CONTROLLING PROCESSOR EXECUTION IN A SECURE ENVIRONMENT", filed on May 11, 2007, both of which are hereby incorporated by reference in their entirety.

The various embodiments of the invention described herein variously relate to apparatus, systems and processes for controlling execution of one or more processors in a secure environment. Further, implementations of these various embodiments may include controlling processor execution in over the air and non-over the air television receiving devices, such as those provided by cable, satellite, telecommunications, wireless and/or other audio, video and/or data service providers.

SUMMARY

The various embodiments described herein relate to apparatus, systems and methods for establishing and enforcing a secure computing environment to execute portions of software. More particularly, one embodiment provides a secure processor that executes portions of software in an environment providing restricted access to the computing environment resources.

In another embodiment, a system for providing a secure computing environment includes, but is not limited to, a secure processor, a context manager, and a trust vector verifier. The secure processor can be configured to execute some or all of software programs and/or routines that have an associated context, which is, for example, a specific operating environment to which the software is restricted. The software can include, for example, methods, sub-programs, routines entire applications, or any portion of one or more software applications. In at least one embodiment, the software can be restricted to one or more contexts.

In yet another embodiment, a method for controlling the execution of a secure processor in a secure operating environment includes a secure processor requesting a context swap. In one embodiment, the context swap is a switch to a new context for a different portion of software. A context manager, in one embodiment, receives the context swap request. The context manager, in further embodiments, loads a trust vector descriptor in a trust vector verifier. In at least one embodiment, the context manager resets the secure processor. The trust vector verifier, in further embodiments, controls the secure processor's access to one or more resources based on the loaded trust vector descriptor.

A computer readable medium is described that has an encoded data structure used for controlling the execution of a secure processor. The data structure can include data about one or more contexts that define the operating environment for the secure processor. Further, a context can include a field identifying a given context, a designation of one or more regions of memory that a secure processor can access, and a designation of one or more hardware resources a secure processor can access. Similarly, a computer system executing the data structure determines if the secure processor can access a hardware resource according to a hardware trust vector.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Some embodiments are described hereinafter with reference to the appended figures. Like numbers within the several figures designate like elements.

DETAILED DESCRIPTION

This disclosure will now more fully describe some embodiments with reference to the accompanying drawings, in which only some of the possible embodiments are shown. Other aspects may, however, be embodied in many different forms and should not be construed as limited to the embodiments set forth herein. Embodiments set forth in this specification relate to methods and systems involving trusted microprocessor computing. Such computing may arise, for example, in subscription satellite television systems. Other embodiments may also include, for example, but are not limited to, cable television, broadcast television, wired or wireless telecommunications systems, audio/video/data distribution systems, any content delivery service, and/or any other computing environment.

Figure 1:
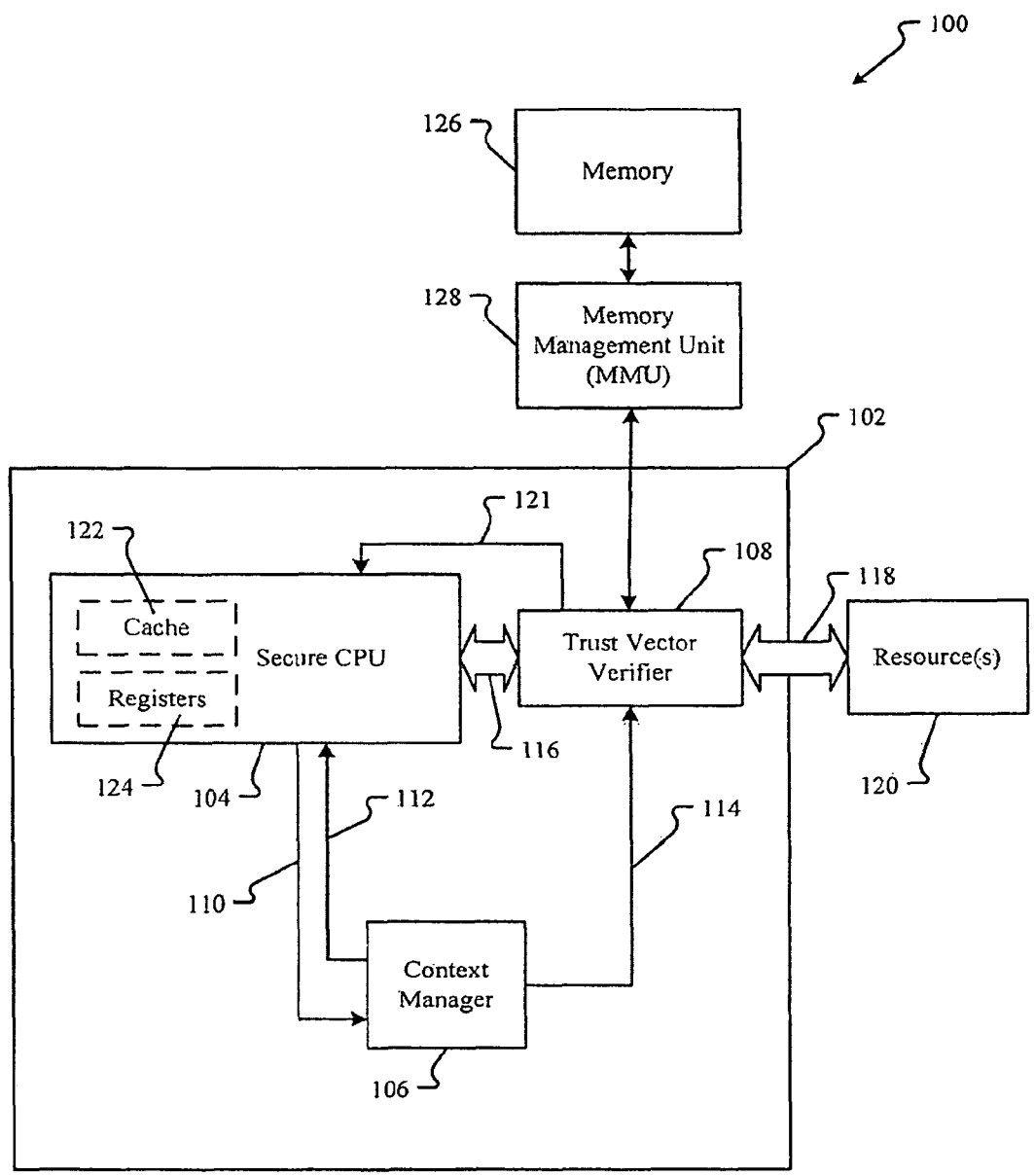
FIG. 1 is a block diagram of a computing environment for use in at least one embodiment of the inventions described herein.

In the embodiment shown in FIG. 1, a computing environment 100 can include a secure computing or operating environment, represented by dashed line 102. The secure computing or operating environment 102 can include a secure central processing unit ("CPU") or processor 104, a context manager 106 and a trust vector verifier 108. Further, each of the processor 104, the context manager 106 and the trust vector verifier 108 can be in direct or indirect communication with each other. The secure processor 104 can be any type of general purpose processor and can be specially designed to be secure, as desired. The context manager 106 and trust vector verifier 108, in embodiments, can be specially designed hardware devices, software modules or a combination of hardware and software for use in embodiments of the present invention.

In one embodiment, the secure processor 104 operates to perform at least three basic activities: executes a mathematical function or logic operation in a software program, moves data to and from different locations in memory to maintain data used in a software program, and/or makes decisions and jumps to new instructions in a software program. To accomplish these tasks, the secure processor 104 may include an arithmetic or logic unit (ALU) (not shown), registers 124, a memory 122 and internal or external memory or other data storage 126. The ALU performs mathematical functions or logic operations. The registers 124 maintain the information or data about an operation being performed by the secure processor 104. For example, a data register may hold a data value utilized in a mathematical operation being completed by the ALU; a memory register may hold the address in memory 126 where data is to be stored. Memory 126 generally consists of one or more hardware devices, structures or components that temporarily or otherwise maintain and/or store data. In one embodiment, memory includes cache 122, which holds data that is accessed regularly by the secure processor 104, and one or more other memories 126. The cache 122 is a memory area integrated within the secure processor 104, a memory directly connected to the secure processor 104 or an area of memory 126 easily accessed or interfaced with the secure processor 104. In another embodiment, memory 126 can include a memory management unit (MMU) 128, which controls the reading and writing of data into the memory 126. Memory 126 may consist of one or more types of memory, for example, random access memory (RAM), read only memory (ROM), hard drives, optical storage, or one or more other memory technologies, which maintain data. One skilled in the art will recognize that the secure processor 104 is not limited to the explanation regarding a computing system, but may include other components and functions known in the art. In addition, the computing system explanation herein is provided to simplify the explanation about embodiments of the present invention and the present invention should not be limited to the computing system described herein.

In performing the three activities mentioned above, the secure processor 104 executes portions of software. These portions of software generally combine to form a software program or application to accomplish a large-scale task. Generally, the portions of software are one or more instructions executed by the secure processor 104. Hereinafter, the portions of software may be referred to as software routines, subroutines or modules. When executing portions of software, the secure processor 104 can create an abstract data type called a stack (not shown). The stack can be a set of memory addresses in memory, for example, cache 122 or memory 126, to/from which the secure processor 104 stores or reads data or instructions, respectively. For example, when an item of data or an instruction is saved into the stack, the secure processor 104 can record, in a register 124, a stack pointer, which is the address in memory where the data or instruction is stored. Data may be shared between two or more portions of software, and, to facilitate this sharing, data can be stored in the stack and the stack pointer provided to the portion(s) of software.

In various embodiments, the secure processor 104 executes various software portions in an operating environment including, for example, a combination of software, memory 122/126 and resources 120. The secure processor 104 can be configured to execute, interface with, and/or utilize software, memory, resources and the like to perform a given operation. To prevent and/or minimize the introduction of malicious or otherwise undesired code, systems, methods, apparatus and the like which facilitate control of the operating environment of the secure processor 104 are provided.

In at least one embodiment, a secure operating environment 102 can be specified by one or more "contexts." A context defines the boundaries of an operating environment by specifying those instructions, functions and/or operations that the secure processor 104 is allowed to perform. For example, a software application may contain four instructions. A context may specify that the secure processor 104 can execute a first of these four instructions, one or more of these instructions, all of these instructions, combinations thereof, or the like. That is, a context can establish a permissive environment that excludes non-specified instructions from being performed. For example, if the secure processor 104 tries to execute an instruction that is not one of the four instructions, an exception is recognized and the secure processor 104 is prevented from executing the other instruction.

In another example, a context can allow a secure processor to only access memory addresses 1-20. Should the secure processor attempt to access memory address 40, an exception is recognized and the secure processor 104 is prevented from accessing memory address 40.

In still another example, a context can specify that the secure processor 104 is allowed to access only a hard drive. Should the secure processor 104 attempt to access a user interface device, an exception is recognized and the secure processor 104 is prevented from accessing the user interface.

In various embodiments, the context manager 106 and the trust vector verifier 108 establish and enforce the context. The context manager 106 administers the changing of contexts. Two or more portions of software each have associated contexts. When executing a first portion of software, a first context is used to define the secure operating environment. Likewise, when the secure processor 104 executes a second portion of software, a different, second context is used to define a different secure operating environment. To switch between portions of software, the context manager establishes a new context that is associated with the new portion of software to be executed. In establishing the new context, the new portion of software executes in an operating environment tailored to that portion of software. Deviations from the context by the new portion of software are recognized as security exceptions. Thus, the secure operating environments are set for each portion of software to control secure processor 104 operations as desired.

As mentioned above, the various embodiments can also include a trust vector verifier 108 which enforces the context. The trust vector verifier 108 is virtually and/or physically positioned (in the flow of data signals) between the secure processor 104 and other virtual or physical components of a given system, such as resources 120 and memory 126. With the trust vector verifier 108 placement, the trust vector verifier 108 can be configured to intercept communications between and/or amongst the secure processor 104, resources 120 and/or memory 126. In embodiments, the trust vector verifier 108 can be loaded with information that defines a given context and which the trust vector verifier 108 compares to the action by the secure processor 104. If an action does not compare with the loaded information in the trust vector verifier 108, the action is not allowed in that context. Actions that do not compare to the loaded information are outside the allowed context. The trust vector verifier 108 recognizes these actions as exceptions and prevents the actions from occurring. For example, the trust vector verifier 108 receives requests from the secure processor 104 for access to memory 126, the trust vector verifier 108 determines if the request is allowed within the current context and, if the request is not allowed, the trust vector verifier 108 recognizes the exception and prevents the access to memory 126.

The secure processor 104 can also be configured to periodically switch between the execution of a first portion of software and a second portion of software. In one embodiment, before switching the execution between different portions of the software, one or more steps can be performed to ensure the security of the system 100. For example, the secure processor 104 can clear the cache 122 and/or MMU 128 and save a pointer to data in the stack. The secure processor 104 can communicate a request for a context swap 110 (i.e., a request to change to a new, predetermined context) to the context manager 106. The context manager 106, in embodiments, sends a reset 112 to the secure processor 104 to reset it and sends an instruction 114 to the trust vector verifier 108 to load the trust vector descriptor associated with the desired context from memory 126 or other secure memory (not shown) that is accessible by the trust vector verifier 108. In embodiments, the reset desirably results in the clearing of one or more internal states of the secure processor 104. It is to be appreciated that such clearing reduces the risk of malicious software being introduced to the secure processor 104. The reset can include any methods that clear one, multiple or all states of the secure processor 104. In another embodiment, the secure processor 104 may be configured, during a reset, such that all state information is rendered inoperable and unusable.

More specifically, for at least one embodiment, the secure processor 104 can accomplish the reset function by executing a boot or hard reset operation. Such booting can occur, for example, before the secure processor 104 executes one or more instructions in a new context. It is to be appreciated that the boot can be a soft boot, requiring the reloading of software, or a hard boot, requiring the powering off and on of the secure processor 104 and/or one or more other components. Desirably but not necessarily for every embodiment, both the soft and hard boots erase some, if not all, of the data and/or instructions stored in the cache 122, the registers 124, and/or the memory 126. In embodiments, one or more commonly known methods can be used to erase some or all of the data or instructions in the cache 122, the registers 124, and/or the memory 126. For example, a stored memory address can be deleted by writing new data over previously stored data. Thus, the secure processor 104 can be configured to erase or otherwise render unusable data and/or instructions useful for a first context that are not desired for a second context.

In at least one embodiment, the secure processor 104 does not maintain any state information from one context to another. That is, the secure processor can be configured to not retain any knowledge of any previous context or software.

As shown in FIG. 1, the trust vector verifier 108 is in communication with the secure processor 104 via communications path 116. In one embodiment and commonly in order to prevent a security exception, the trust vector verifier 108 can be configured to send a hardware interrupt 121 to the secure processor 104. Upon receipt of the hardware interrupt 121, the secure processor 104 resets, as explained below in conjunction with FIG. 3, and/or boots or reboots into another context. This other context may be pre-determined or determined in real-time. In another embodiment, the trust vector verifier 108 can be configured to process the security exception in the current context while requesting a context swap to a new context in response to the security exception.

The trust vector verifier 108 can be configured and loaded with information, in various embodiments, which enables it to enforce any given context. Such information can be permanently loaded, loaded in advance of a context swap, loaded during a reset of the secure processor, loaded after the secure processor 104 is reset, and/or at another time. For example, the loaded information can include one or more trust vector descriptors that are loaded from memory 126 or other secure memory (not shown). Such memory 126 can be configured so that it is accessible only by the trust vector verifier 108, as desired. In other embodiments, the trust vector verifier 108 can include and/or have access to one or more dedicated or shared memory devices such as a ROM, an EEPROM, a hard drive, or the like. Such memory can be configured to persistently contain, as desired, one or more trust vector descriptors. The trust vector descriptor, in at least one embodiment, defines: the software programs, routines and/or instructions the secure processor 104 may execute. The trust vector descriptor can also be configured to define how, when and/or which resources the secure processor 104 can access, control, utilize, communicate, or the like. Similarly, the trust vector descriptor can define which memory 126 or 122 the secure processor 104 may access, and other activities the secure processor 104 may initiate, execute, and complete in the context.

Figure 2:
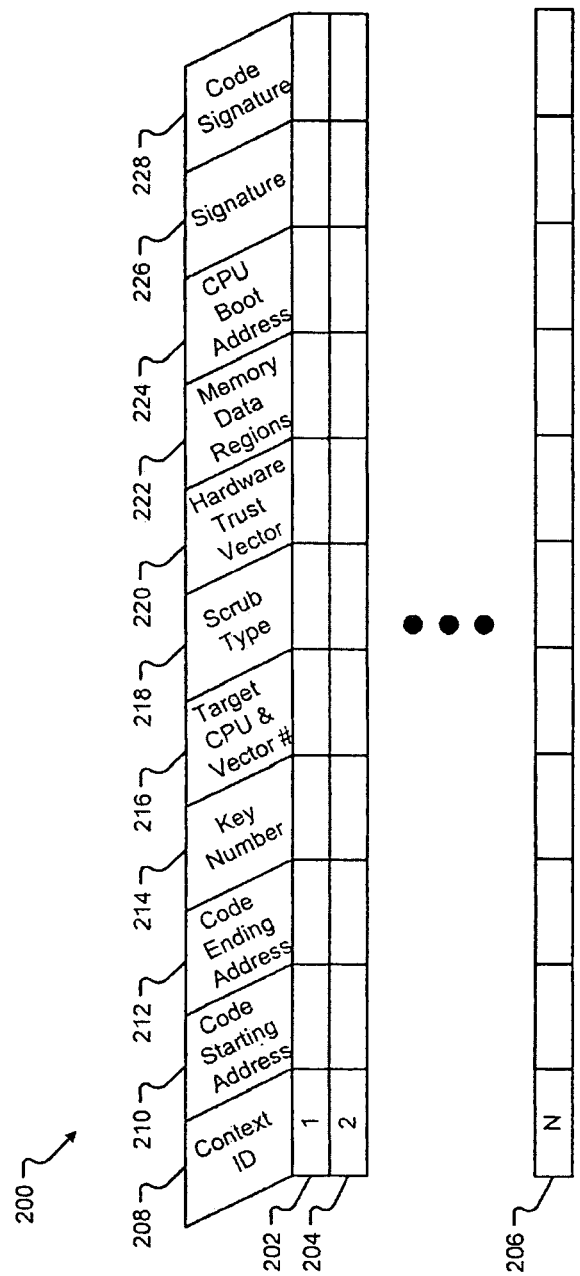
FIG. 2 is a simplified data structure diagram of an embodiment of a trust vector table for use in at least one embodiment.

One embodiment of a trust vector descriptor is shown in FIG. 2. In this embodiment, the trust vector descriptor includes at least one trust vector descriptor 202 and may include multiple trust vector descriptors 202, 204, or 206. The trust vector descriptor(s) can be stored, for example, in a trust vector table (TVT) data structure 200 or any other desired data structure. As mentioned above with reference to FIG. 1, upon loading or otherwise designating a trust vector descriptor 202 for use by the trust vector verifier 108, a new context is established and governs the operation of the secure processor 104.

As further shown in the embodiment depicted in FIG. 2, each trust vector descriptor 202, 204, and 206 can define a different context, and, as such, can have different data. The data in each section of the trust vector descriptor 202, 204, and 206, in embodiments, is of a certain type. Each trust vector descriptor 202, 204, and 206 may contain one or more other data fields but is not limited to the described data fields. The trust vector descriptors 202, 204, and 206 may be identified by context identification (ID) fields 208. In further embodiments, each trust vector descriptor 202, 204, and 206 can include data fields for code starting address 210, code ending address 212, key number 214, target CPU and vector number (#) 216, scrub type 218, hardware trust vector descriptor 220, memory data regions 222, CPU boot address 224, trust vector descriptor signature 226, and code signature 228.

The code starting address 210 and the code ending address 212 identify what portion of code is to be authenticated and then executed by the secure processor 104 (FIG. 1). It is to be appreciated that there are other methods for identifying the portion of code to be executed, for example, the code starting address and the length of the code. For example, the code starting 210 and ending 212 address can designate one or more sets of multiple, discontinuous regions of memory that contain the desired code. Such regions can be further designated, for example, by two or more starting and ending addresses.

In at least one embodiment, a trust vector descriptor 202, 204, 206 can include a key number and/or other reference information used to verify the authenticity of the software and/or portion thereof that is to be executed. The reference information can include, for example, a fingerprint (an identification) of the code used to authenticate the code, a signature of the code used to authenticate the code, and/or a reference to a key used to verify a signature of the code. Further, in an embodiment with multiple keys, the key number 214 can specify which key to use to verify a generated signature and thereby authenticate a portion of software. It is to be appreciated that such verification can occur, for example, by comparing the generated signature to the trust descriptor signature 226, and/or the code signature 228.

The target CPU field 216 provides a designator for which processor to use, if the system has multiple processors. As will be explained in conjunction with FIG. 4, portions of software can be executed on one or more secure processors. The vector number field 216 provides a designator for the trust vector descriptor 202.

Figure 6:
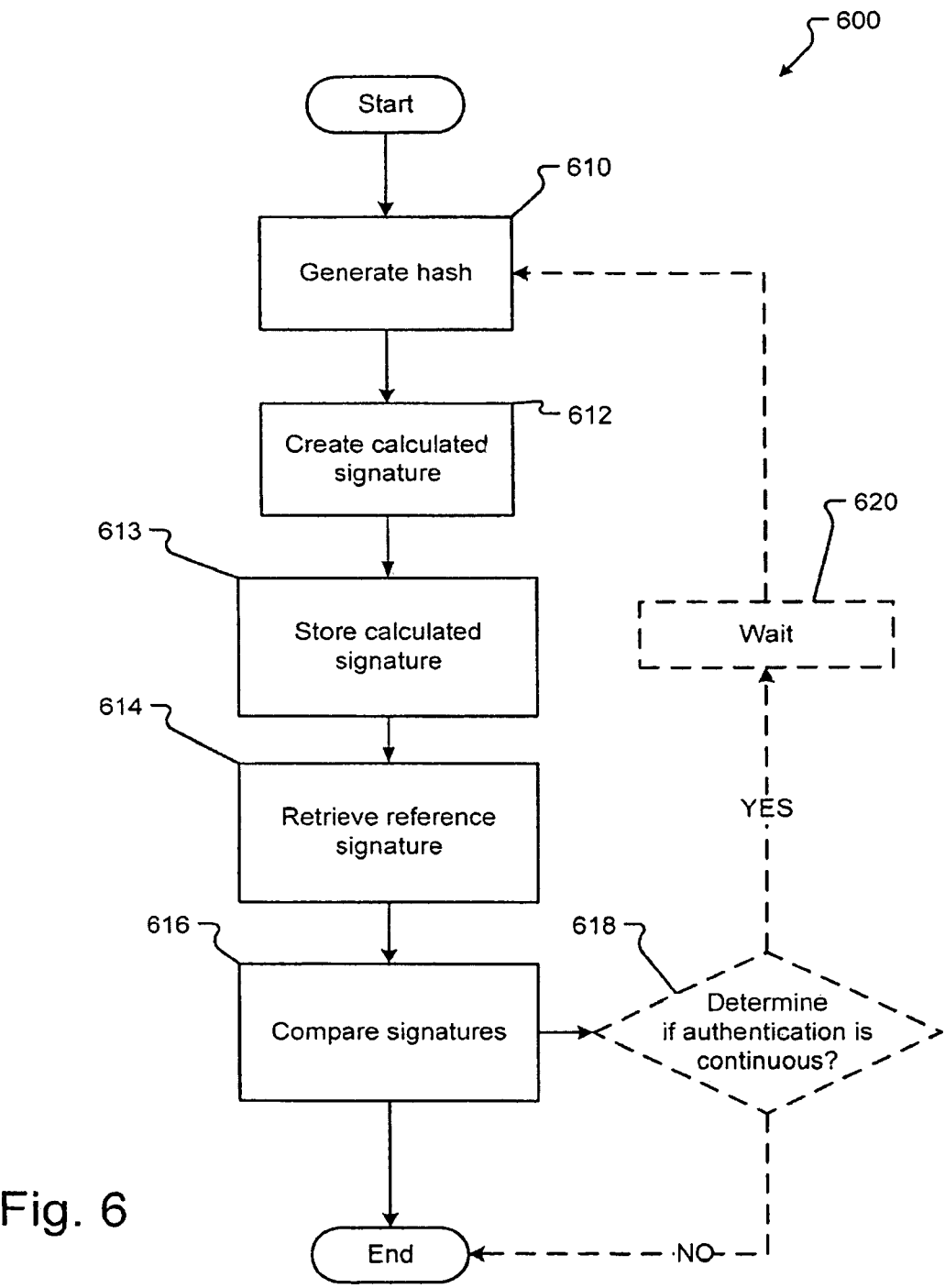
FIG. 6 is a flow diagram of a method for authenticating a memory region for software code or data, for use in and/or with at least one embodiment of the inventions described herein.

The scrub type field 218 provides information on how to scrub the portion of software, i.e., prove the authenticity of the portion of software, as discussed in conjunction with FIG. 6. For example, if the portion of software is authenticated or scrubbed once, the scrub type field 218 can include a designator of "initial" scrub. Other types of scrubbing methods include, but are not limited to: "continuous" scrub, whereby the portion of software is scrubbed continuously while operating, and "never," which does not require any scrubbing of the portion of software. In other embodiments, other scrubbing methods can be used.

The hardware trust vector descriptor field 220 can be used to define resource access in the context. More specifically, the hardware trust vector descriptor 220 identifies those resources, such as peripheral devices or internal components, with which the secure processor 104 (FIG. 1) can interface, communicate or the like during operations performed within the context defined by a given trust vector descriptor 202, 204, 206. In one embodiment, the hardware trust vector descriptor 220 can be a bit map or bit array wherein each bit of the array represents a certain type of hardware. For example, the hardware trust vector descriptor 220 may appear as "0101." The first bit, set to "1," may represent that the processor can access a hard drive controller. The second bit, set to "0," may represent that the processor cannot access a smart card. The third bit, set to "1," and the fourth bit, set to "0," can represent that the processor can access an I/O port but cannot access a video controller. The number of bits in the hardware trust vector descriptor 220 can vary with the embodiment in which the secure processor is used and can be fewer or more than four bits. It is to be appreciated that other embodiments of the hardware trust vector descriptor 220 can be used. For example, a trust vector descriptor 220 can be configured so that all resources, within a given implementation, are available to the secure processor except for those identified by the hardware trust vector 220. Other embodiments are also possible and are included within the scope of the appended or hereafter added claims.

The memory data region field 222 can also be used to define resource access in the context and further define which address spaces in memory 126 (FIG. 1) the secure processor 104 (FIG. 1) can access, for example, to read and/or write data from/to memory. As for the hardware trust vector 220, the memory data regions field 222 can specify address spaces by specific address, based upon start and stop addresses, as contiguous blocks, and/or otherwise. Also, address spaces can be expressed in the affirmative (i.e., those that can be accessed), the exception (i.e., all are accessible except for those identified) or otherwise. As such, it is to be appreciated that the memory data regions field 222 can identify addresses at which executable data can be read and/or written. Data contained in one or more non-defined addresses can, likewise, be designated as non-executable, such that a security exception will occur should the secure processor attempt to execute code and/or utilize data from a prohibited data region.

In one embodiment, one or more portions of the accessible memory 126 (FIG. 1) are shared with other portions of the software. Further each portion of the software may execute in one or more contexts. In such an embodiment, one portion of software may have a need to pass data to another portion of software although the two portions of software are not executed in the same context. The memory data region field 222 can be configured to support this situation by using, for example, an exceptions approach to identified address spaces. Similarly, in another embodiment, the memory data regions field 222 can include, for any or each region of memory specified thereby, a common or separate scrub bit designating the region(s) of memory that are to be included in one or more scrubbing operations.

As discussed for at least one embodiment described herein, when the secure processor 104 (FIG. 1) swaps contexts, the secure processor can be reset and boots into the new context. With reference to FIG. 2, the CPU boot address field 224 provides an address in memory 126 (FIG. 1), at which to boot the secure processor 104 (FIG. 1). In one embodiment, the boot address 224 is an offset in flash memory. In other embodiments, the boot address 224 is a ROM address, RAM address or other address for a memory 126. Each context, in an embodiment, can have a unique boot address 224.

The trust vector descriptors 202, 204, and 206 can also include a signature field 226. The signature field 226 provides a data value, for example, a private key, for use in verifying each trust vector descriptor 202, 204, 206. The verification of the trust vector descriptor can occur before or after the trust vector verifier 108 (FIG. 1) is instructed to load a given trust vector descriptor. Further, signature field 226 can be configured to provide a signature for use in verifying some or all of the data in fields 208 through 228 of a given trust vector descriptor. Further, it is to be appreciated that some, none or all of a given portion of software can be scrubbed, as explained in conjunction with FIG. 6, or authenticated before allowing the secure processor 104 (FIG. 1) to execute the some or all of the given portion of software.

In at least one embodiment of the present invention, a trust vector descriptor can also be configured to include a code signature field 228 which provides data for use in verifying a given portion of software code prior to execution of the same by the secure processor. It is to be appreciated that any type of digital signature can be used as the signature 226 and/or the code signature 228. For example, the digital signatures can use a private and public key system, such as those authentication methods described in the Digital Signature Standard (DSS), Federal Information Processing Standard Publication 186, May 19, 1994, which document is incorporated herein by reference in its entirety for all that it teaches and specifically for its teaching of the use of digital signatures, private key systems and public key systems.

Figure 3A:
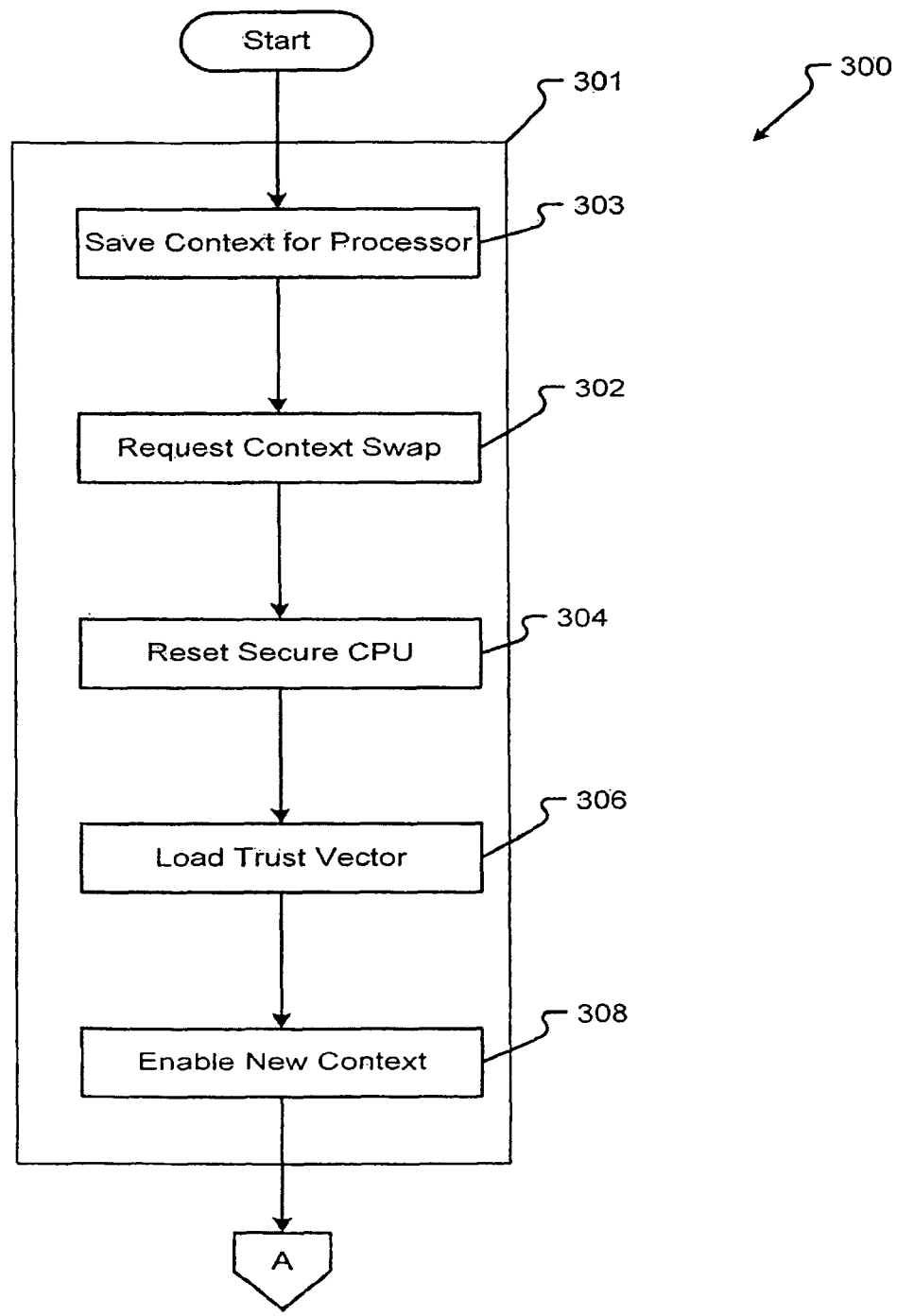
FIG. 3A and FIG. 3B are flow diagrams of an embodiment of a method for changing contexts in a computing environment and maintaining the computing environment.
Figure 3B:
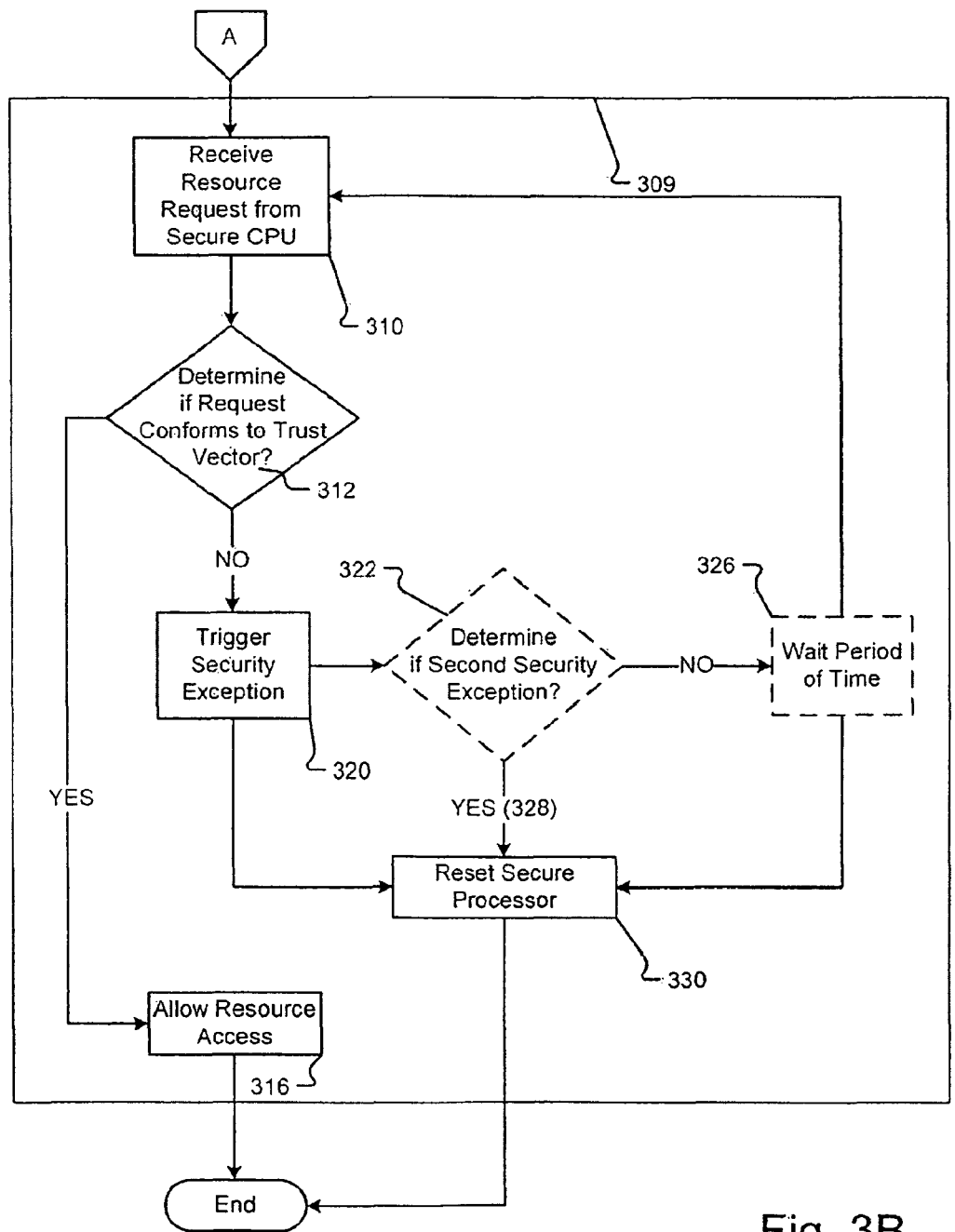

A flow diagram showing an embodiment of a process 300 for swapping contexts 301 and for managing security exceptions 309 is shown in FIG. 3A and FIG. 3B. The context swap process may be executed by the context manager, the secure processor and/or a combination of the secure processor and the context manager. As shown in FIG. 3A, the context presently being executed by the secure processor 104 (FIG. 1) is saved (Operation 303). In at least one embodiment, the secure processor 104 (FIG. 1) saves the pointer to the stack, stores any required data to memory 126 (FIG. 1), and completes any "clean-up" functions required before the context swap occurs. The save operation can occur before a context swap (as shown in FIG. 3A), on demand, at regular intervals, on an as needed basis, and/or otherwise. The context swap process can also include the communication of a context swap request (Operation 302). This request is commonly sent from the secure processor to the context manager and can occur before or after a context swap is requested and can arise in a wide variety of circumstances.

For example, the secure processor 104 (FIG. 1) can be executing a first portion of software when a situation arises that results in the secure processor needing to execute a second portion of software under a different or second context. To facilitate the execution of the second portion of software, the secure processor 104 (FIG. 1) can be configured to communicate a request to swap contexts to the context manager 106 (FIG. 1)—as shown in FIG. 3A by operation 302. The context swap request can include, for example, the context ID 208 (FIG. 2) for the context 202 (FIG. 2) to which the secure processor 104 (FIG. 1) desires to swap. The context swap request may contain additional or other information depending upon the particular implementation or embodiment being used.

As further shown in FIG. 3A, the context swap process can include resetting the secure processor 104 (Operation 304). That is, the secure processor can be reset by the context manager after receiving a context swap request communicated by the secure processor. The secure processor reset desirably erases any data in the secure processor cache 122, MMU 128, registers 124, memory or the like and purges the previous software state from the secure processor 104 (FIG. 1). Also, it is to be appreciated that various embodiments can include a reset operation 304 without a request operation 302 and/or a save operation 303 being accomplished.

As further shown in FIG. 3A, a context swap process can also include loading a trust vector into the trust vector verifier (Operation 306). When desired, the context manager 106 (FIG. 1) loads a trust vector descriptor, such as descriptor 202 (FIG. 2), into the trust vector verifier 106 (FIG. 1). As discussed above with respect to certain embodiments of the present invention, the trust vector verifier can be pre-loaded with descriptors that are in a non-active state. Thus, it should be readily appreciated that the loading of the trust vector verifier can be optional and/or unnecessary for any given embodiment.

The context swap process also includes enabling the new context (Operation 308) such that the portion of software loaded into the trust vector verifier or, as necessary, otherwise designated for an active state, is ready for use with the new context. In some embodiments, the trust vector descriptor 202 (FIG. 2) can be authenticated by comparing the signature 226 (FIG. 2) saved in the trust vector descriptor 202 (FIG. 2) against a generated signature. Such authentication can occur before or after the descriptor is loaded into the trust vector verifier 108. Similarly, the portion of software to be executed under a new context can be authenticated by comparing the code signature 228 (FIG. 2) against a generated signature. Authenticating the trust vector descriptor and the portion of software are discussed in more detail below in conjunction with FIG. 6. The loading of the trust vector descriptor 202 and the portion of software desirably configures the secure processor for execution of the software in the new context.

An embodiment of a process for managing security exceptions 309 is shown in FIG. 3B. For at least this embodiment, a resource request is received, by the trust vector verifier 108 (FIG. 1), from the secure processor 104 (FIG. 1). Upon receipt of the resource request (Operation 310), the trust vector verifier compares the request to the current, active trust vector descriptor and determines if the request conforms to the descriptor (Operation 312). For example, the trust vector verifier can compare a requested memory address to the list of authorized memory data regions 222 (FIG. 2) in the current, active trust vector descriptor.

When the request conforms to the current, active trust vector descriptor, the trust vector verifier allows communications to occur between the secure processor and the resource (Operation 316). For example, the trust vector verifier passes the resource request 118 (FIG. 1) to the appropriate resource 120 (FIG. 1).

When the request does not conform to the trust vector descriptor, a security exception can be triggered (Operation 320), which results in a reset of the secure processor (Operation 330). In at least one embodiment, the trust vector verifier sends a hardware interrupt or reset instruction, such as instruction 121 (FIG. 1), to the secure processor. Further, for at least one embodiment, the entire chipset, and not just the secure processor, can be reset when a security exception occurs.

The process can further include an optional determination of whether a most recently triggered security exception is a second incidence of the security exception occurring (Operation 322). When the most recently triggered security exception is not a second security exception, the trust vector verifier can be instructed to wait for a predetermined or real-time determined time period (Operation 326). Further and for at least one embodiment, the trust vector verifier can be programmed to alert the secure processor that it will be reset after a given wait period expires. It is to be appreciated that during the wait period, the secure processor can accomplish additional processing actions and/or request additional resources. Upon the wait period expiring the secure processor is reset (Operation 330).

In at least one embodiment, resets of the secure processor can occur under at least two separate situations. First, the secure processor 104 (FIG. 1) can be reset by the context manager 106 (FIG. 1) in response to a context swap. The context swap reset inhibits any malicious code possibly injected into the system 100 (FIG. 1) from accessing state information associated with another context. Second, the secure processor 104 can be reset whenever the trust vector verifier 108 (FIG. 1), in response to one or more security exceptions, initiates a hardware reset, or hard boot, of the secure processor 104 (FIG. 1) and/or any support circuitry. In this situation, the security exception hardware reset prevents malicious code from completing processes that are not authorized in the current context. Thus, it is to be appreciated that the context swaps and security exceptions can initiate resets that facilitate the secure and/or authorized use of the secure processor, memory, resources and the like and provide some degree of protection against the insecure and/or unauthorized use of such components.

Figure 4:
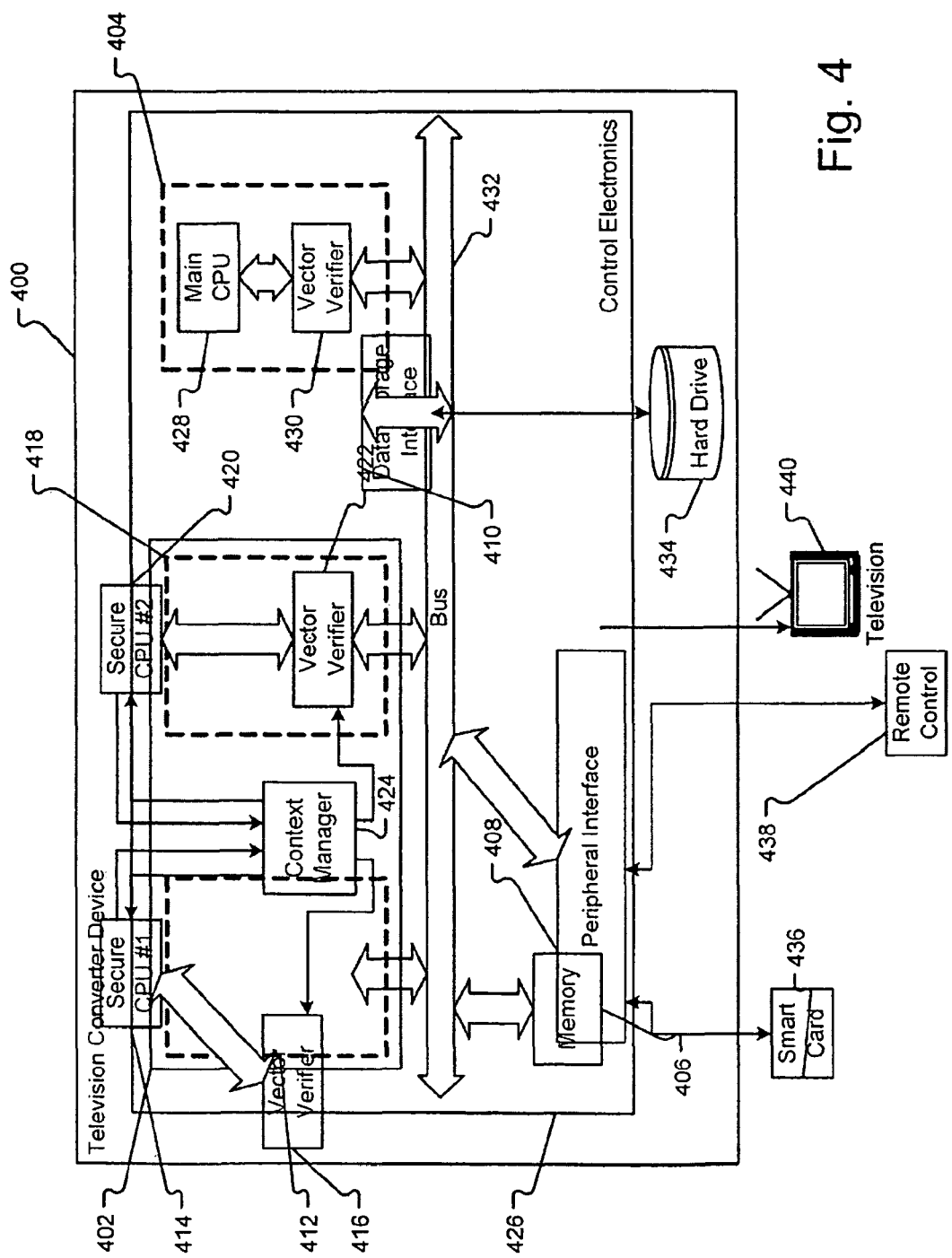
FIG. 4 is a block diagram of a device for use in at least one embodiment.

A block diagram of an embodiment of device 400 including an embodiment of a secure operating environment 402 is shown in FIG. 4. The device 400 could be, for example, a satellite television converter device. In at least one embodiment, the device 400 can include control electronics 426, which can further include one or more of, but is not limited to, a secure operating environment 402, a main processor environment 404, memory 406, a peripheral interface 408, and a data storage interface 410 (for use when external data storage is provided, such as by a hard drive 434). More specifically, the secure operating environment 402 can include a first secure operating environment 412 including a first secure processor 414 and a first trust vector verifier 416 and a second secure operating environment 418 including a second secure processor 420 and a second trust vector verifier 422. Other embodiments of the secure operating environment can include a single secure processor, multiple secure processors, a single vector verifier, multiple vector verifiers, single operating environments or multiple operating environments. The first secure operating environment 412 and the second operating environment 418 can also be operably connected to one or more common or dedicated context managers 424. Thus, it is to be appreciated that various combinations of environments, processors, vector verifiers and context managers can be used.

As further shown in FIG. 4, the control electronics 426 can also include a system bus 432. Communication to and from the bus can be direct, as shown in FIG. 4, and/or via one or more stand alone or integrated bus masters or the like. For example, the secure processors 414/420 can include bus masters.

Trust vector verifiers 416, 422, and 430 are desirably configured to mediate communications to/from the system bus 432 from/to a secure processor, respectively. Further, it is to be appreciated that one more secure processors (for example, secure processors 414 and 420) can be configured to execute the same (in parallel) or different functions or tasks of the control electronics 426. For example, processor 414 can be configured to process display data and user commands while processor 420 is configured to process security functions, e.g., decrypting the video signal, verifying user viewing rights, and interacting with other components of television converter device 400.

A secure operating environment 402, including the secure processors 414 and 420, the trust vector verifiers 416 and 422, and the context manager 424 can be provided in one more integrated circuits or separated, discrete components. For example, processors 414 and 420 can be combined with the trust vector verifiers 416, and 422, respectively, into a single integrated circuit or two separate integrated circuits, i.e., one integrated circuit for each secure operating environment 412 and 418.

Further, the secure processors 414 and 420, trust vector verifiers 416 and 422, context manager 424 and/or other components can be provided in any desired combination of hardware and/or software. For example, context manager 424 can be a software module which includes one or more processes. Similarly, hardware circuitry can be used which includes one or more logical components.

Control electronics 426 also can include one or more volatile and/or non-volatile memory components 406. Examples of such memory devices include, but are not limited to, random access memory and flash memory.

The secure processors 414 and 420 and/or the context manager 424 can also or alternatively be connected to one or more common or separate memory components or memory ranges (not shown). The memory component (which can be secure) may be used to store, for example, a TVT 200 (FIG. 2) and/or one or more trust vector descriptors 202 (FIG. 2) corresponding to one or more contexts. Likewise, a memory component can be configured to store a calculated hash used in the comparison of a calculated signature and a reference signature of the trust vector descriptor and/or the software portion.

A context memory range, reference signature and trust vector descriptor can be stored in unsecure memory 406. For example, a context memory range, reference signature, and/or trust vector descriptor can be stored in re-writable and volatile memory, such as random-access memory (RAM), dynamic RAM (DRAM), static RAM (SRAM), or flash memory. In at least one embodiment, the context manager 424 can communicate with memory 406 by using a pointer, memory address, or similar reference.

Secure processors 414 and 420 and trust vector verifiers 416, 422, and 430, in at least one embodiment, can be general purpose processors. Secure processors can also include, but are not limited to, caches and memory management units (MMUs). Secure processors can also execute, as needed, instruction fetches, data read/writes, I/O read/writes and other functions and routines.

One or more trust vector verifiers 416, 422, and 430, utilize one or more address checkers to mediate access between the secure processors 414 and 420 and the system bus 432, memory 406, peripheral interface 408, data storage interface 410 and/or other components of control electronics 426. Further, the trust vector verifiers 416, 422, and 430 prevent direct connections from processors 414, 420, or 428 to the system bus 432 and, by extension thereof, to memory 406, peripheral interface 408, or hard drive interface 410. By acting as a gatekeeper between the processors and the bus, the trust vector verifiers can control and facilitate connection and/or isolation between secure processors and other system components.

Trust vector verifiers can be configured, depending upon the embodiment in which they are used, to handle one or more contexts at any given time. Likewise, trust vector verifiers 416, can be configured, as address checkers, to store and verify valid memory ranges for a given context. Such information can be stored, for example, as individual entries in a trust vector descriptor. One skilled in the art will recognize that other ways of handling context data are possible and within the scope of the various embodiments of the present invention.

Trust vector verifiers can be configured to respond, by signaling, flagging, security exception or otherwise, whenever a determination is reached that one or more processor access requests are outside a valid range. Similarly, trust vector verifiers can be configured to verify access modes such as read, read/write, and write for any range of memory 406. For example, a trust vector verifier 416 can be configured so that, upon receiving a write request by secure processor 414, it determines whether a data memory range is a valid range for the respective context and whether the data memory range permits write access. If, for example, write access is not permitted, the trust vector verifier 416 can be configured to flag a security exception.

In the various embodiments, a memory range used to store program code or data can be contiguous or non-contiguous. For example, a memory range could be in the form of one or more addresses and lengths of one or more from-to addresses. Likewise, a memory range can utilize one or more memory components or devices. For example, a memory range can utilize two DDR-SDRAM memory components, one DDR-SDRAM memory component in combination with three EEPROM memory components, and/or other combinations of actual and/or virtual memory and/or data storage devices. Such devices can be proximal or distal to given control electronics.

With further reference to FIG. 4, a trust vector descriptor can also be used to partially or wholly authorize peripheral components corresponding to one or more context. For example, a trust vector descriptor can authorize access to one or more of the smart cards 436, the remote controls 438, televisions and/or other peripherals via peripheral interface 408. The one or more peripherals can be represented, for example, in a trust vector table by entry pointers and peripheral ranges. Ranges may be expressed in the form of one or more from-to addresses. As explained in conjunction with FIG. 2, a bitmap can be used to authorize the peripheral within the trust vector descriptor of a context, for example, the bitmap "0101 B" is interpreted to authorize peripheral components one (1) and three (3).

In the embodiment shown in FIG. 4, context manager 424 is responsible for managing secure context swaps on secure processors 414 and 420. In one embodiment, during an initial phase, i.e., during the boot process for television converter device 400, context manager 424 receives the trust vector descriptors for one or more contexts from memory 406. Before the trust vector descriptors are loaded into context manager 424, the integrity of the trust vector descriptors can be verified by authenticating the trust vector descriptors. For example, the integrity of the trust vector descriptors can be verified by using a hash function to calculate a digest, signing the digest with a key to create a calculated signature and comparing the calculated signature with the reference signature 226 (FIG. 2). In this example, a security exception can be generated or control electronics 426 can be alerted if the comparison of the calculated signature and the reference signature does not match, and the context manager 424 will be unable to enable the software.

In at least one embodiment, trust vector verifiers 416 and 422 can restrict trust vector descriptors to a certain range or ranges of memory 406. For example, during an initial phase boot process and prior to the trust vector verifiers 416 and 422 receiving one or more commands from context manager 424, one or more trust vector descriptors can be loaded from a certain defined range or ranges of memory 406 and not from other ranges of memory.

In further embodiments, the code stored in the memory range from region 210 (FIG. 2) to region 212 (FIG. 2) listed in the trust vector descriptor can also be authenticated for the one or more contexts. Likewise, the context manager 424 can store the calculated hash used in the authentication for further context validation.

As explained in conjunction with FIG. 3 for at least one embodiment, the secure processors 414 and 420 can change contexts by transmitting a signal, for example, a request for a context swap, to the context manager 424. Context manager 424, upon receiving a designation of one or more trust vector descriptors, verifies the authenticity of the program memory ranges corresponding to the one or more contexts. Once the context memory ranges are verified, the context manager 424 notifies trust vector verifiers 416 and 422 of the range or ranges of memory 406 that correspond to the verified contexts for loading the trust vector descriptors. In one embodiment, the reference signatures for the program memory range and data memory range of memory 406 are verified upon initialization, continuously, randomly, according to a schedule, or in response to some event.

The range or ranges of memory 406 and reference signatures that correspond to one or more contexts can be encapsulated and/or stored in an unsecured location. For example, the range or ranges of memory 406 and reference signature corresponding to one or more contexts can be encapsulated in a definition header. Further, asymmetric keys can be used to derive signatures. However, it should be appreciated that securely stored symmetric keys can be used to also derive signatures.

Referring again to FIG. 4, control electronics 404 can include a main processor operating environment 404 which further includes a main processor 428 and a main trust vector verifier 430. In at least one embodiment, the main processor environment 404 can be used to execute, for example, user interface and other software routines. Commonly, such routines do not require the same level of security as the routines executed by secure processors 414 and 416.

Further, certain processes that are unable to execute secure context swaps, such as a Linux operating systems, are commonly executed by a main processor 428 and not a secure processor 414. Further, the main environment can be configured to include a trust vector verifier 430 configured to mediate access by the main processor to one or more resources. Further, a context manager can be excluded from the main environment and thereby eliminate context swaps by the main processor.

Figure 5:
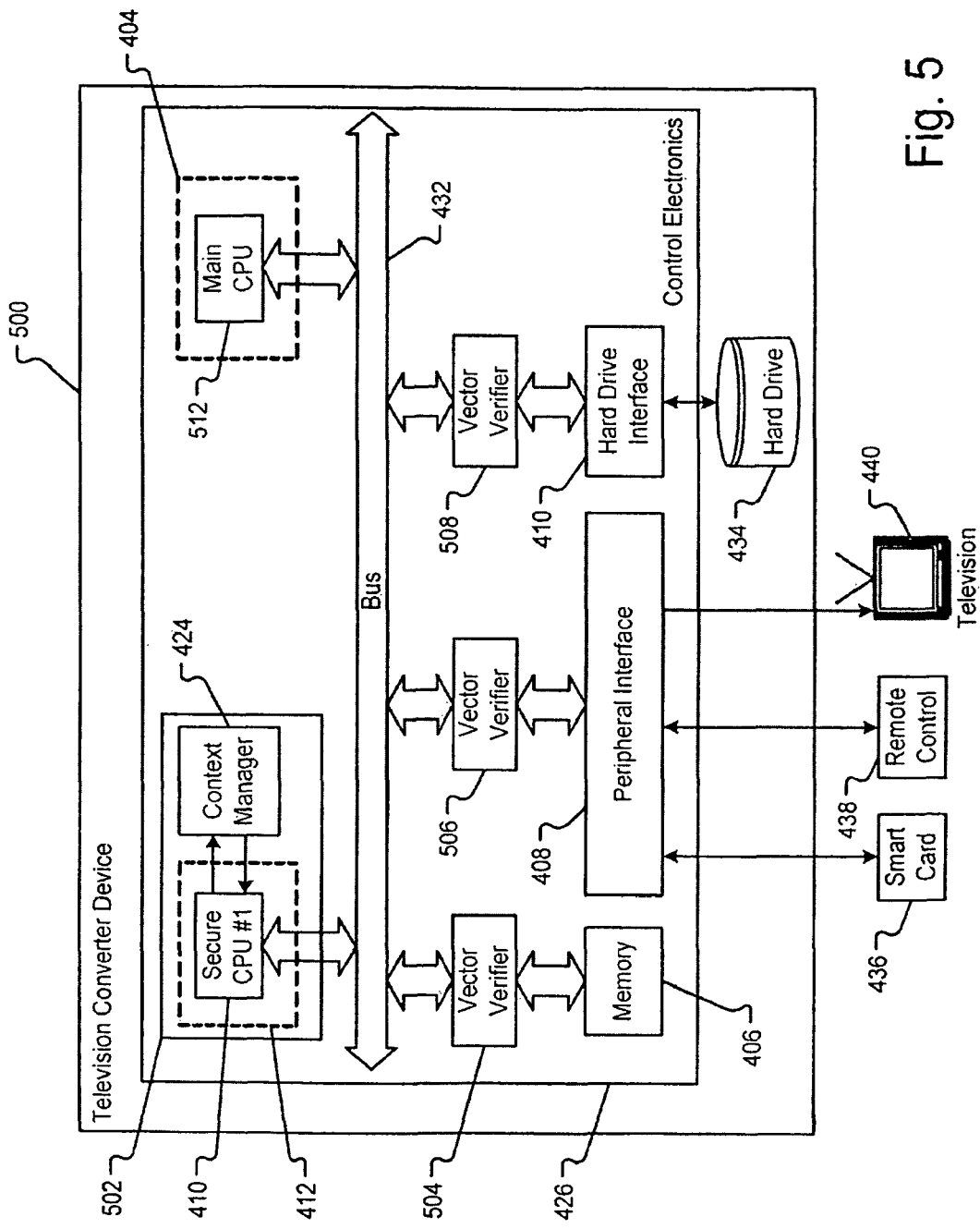
FIG. 5 is a block diagram of a device for use in another embodiment.

FIG. 5. provides a block diagram of a device for use in at least one embodiment. As shown, this device 500 includes a secure operating environment 502 having, a secure processor 410 and a context manager 424. Further, this device includes a main processing environment 404 containing a main processor 512. The secure processor 410 and main processor 512 are interconnected via a bus 432. Trust vector verifiers 504, 506, and 508 are connected to the bus 432 and are configured to mediate access requests to one or more resources by the secure processor 510 and/or the main processor 512. Trust vector verifiers 504, 506, and 508 can be configured to operate asynchronously relative to secure processor 410. More specifically, the context manager 424 loads trust vector verifiers 504, 506, and 508 during an initial phase, e.g., a boot sequence, with the range or ranges of memory 406 that are relative to a specific context, or more generally to a security level. This context can then be used for all communications between a processor and a resource until a context change is executed and new trust vector descriptors are loaded into one or more vector verifiers. Thus, it is to be appreciated that the secure processor, via its associated context manager, determines the configuration of vector verifiers utilized by itself and the main processor.

In another embodiment, individual components can have more than one trust vector verifier and more than one secure processor can access the same verifier module. For example, in a multiple secure processor configuration, multiple trust vector verifiers per component permit further asynchronous handling of two or more contexts per component. In yet another embodiment, one or more components separately connect to the system bus 432 without or in addition to another connection that is mediated by trust vector verifiers 504, 506, and 508.

Referring now to FIG. 6, a process 600 for scrubbing or authenticating a memory range, either for a software portion, a trust vector descriptor, or data, is shown for at least one embodiment of the present invention. As shown, a hash is generated of the local data specified for authenticating (Operation 610). For example, control electronics 426 (FIG. 4) determines a hash value or other similar value for the memory range.

The hash is signed with a key and thereby a calculated signature is generated (Operation 612). In at least one embodiment, the reference hash can be signed with a public key to generate the calculated signature. The calculated signature is stored for comparison (Operation 613).

As further shown in FIG. 6, the authentication process can include retrieving a reference signature (Operation 614). For at least one embodiment, the context manager 106 (FIG. 1) retrieves the reference signature for the signature field 226 (FIG. 2) or the code signature field 228 (FIG. 2) of the trust vector data structure. It is to be appreciated, however, that the reference signature can be retrieved from a different data structure or received from another component. For example, the context manager may retrieve the signature from a secure memory. In at least one embodiment, a previous hash was signed with a private key to create the reference signature.

As further shown in FIG. 6, an authentication process can include comparing the calculated signature to the reference signature (Operation 616). That is, the context manager 106 (FIG. 1) can mathematically compare the calculated signature created by signing the hash with the public key with the reference signature retrieved from the trust vector data structure. It is to be appreciated that the comparison of the calculated signature and the reference signature may be completed by a bit wise comparison or other computational process. If the signatures compare, the software portion, a trust vector descriptor, or data is authenticated.

The authentication process optionally includes determining if the authentication process is continuous (Operation 618). In at least one embodiment, the context manager 106 (FIG. 1) determines the setting for the scrub type data field 218 (FIG. 2) in the trust vector descriptor. For example, if the continuous scrub type bit is set in the scrub type data field 218, then the context manager 106 (FIG. 1) determines that the authentication is continuous. It is to be appreciated that the context manager 106 (FIG. 1) can determine the type of authentication by examining a value in a header sent with the software portion, a trust vector descriptor, or data, by retrieving a setting in another portion of memory, or by receiving an instruction from another component.

If the authentication is continuous, a further embodiment of the authentication process shown in FIG. 6, can optionally include waiting a period of time to perform another authentication on the same software portion, a trust vector descriptor, or data (Operation 620). In at least one embodiment, the context manager 106 (FIG. 1) waits a predetermined period of time and then completes another authentication on the same software portion, a trust vector descriptor, or data. The predetermined period of time can be any time period from fractions of a second, seconds, minutes, hours, days, or likewise. In at least one embodiment, a timer in the context manager 106 (FIG. 1) counts the predetermined time period. Upon reaching a set limit, the authentication process is performed again.

In accordance with the above, one embodiment includes a system for executing software in a secure computing environment. The system includes a secure processor configured to request a context swap from a first context to a second context when switching execution from a first portion of software to a second portion of software. The system further includes a context manager, in communication with the secure processor, that is configured to receive the requested context swap and initiate the context swap. The system further includes a trust vector verifier, in communication with the secure processor and the context manager, that is configured to a load trust vector descriptor upon command from the context manager.

In at least one embodiment, the context manager, in response to the context swap, initiates a reset of the secure processor.

In at least one embodiment, the context manager associates a trust vector descriptor with the second context.

In at least one embodiment, the trust vector verifier controls access to one or more resources by the secure processor according to the trust vector descriptor.

In at least one embodiment, the system includes a second secure processor in communication with the context manager. The second secure processor executes one or more other portions of software and is configured to request a context swap from a third context to a fourth context when switching execution from a third portion of software to a fourth portion of software. The system also includes a second trust vector verifier in communication with the second secure processor and the context manager that is configured to load a second trust vector descriptor upon command from the context manager. The trust vector verifier is configured to control access to one or more resources by the second secure processor according to the second trust vector descriptor.

In at least one embodiment, the system includes a main processor configured to execute a portion of software in a static context. The system also includes a main trust vector verifier in communication with the main processor configured to load a trust vector descriptor and control access to one or more resources by the main processor in the static context.

In at least one embodiment, the system includes a bus master in communication with the main trust vector verifier configured to execute an operation in the static context.

In at least one embodiment, the portion of software executed in the static context is the operating system.

Another embodiment comprises a system for executing software in a secure computing environment. The system includes two or more secure processors, with each secure processor configured to request a context swap from a first context to another context when switching execution from a first portion of software to another portion of software. The system further includes a context manager, in communication with each of the two or more secure processors, configured to receive the context swap requested by at least one of the two or more secure processor. In response to the received request, the context manager initiates a reset of the requesting secure processor and associates with the other requested context a first trust vector descriptor configured for use in controlling access to at least one resource. The context manager further initiates a swap to the other requested context. The system also includes a main processor configured to execute an operating system in a static context. The system also includes a plurality of trust vector verifiers, with each trust vector verifier in communication with at least one of the secure processors and the main processor. The trust vector verifiers are configured to load the first trust vector descriptor associated with the requested context or a main trust vector descriptor configured for use in controlling access by the main processor to one or more resources.

In at least one embodiment, one of the secure processors is configured to request a first context swap from a first context to a second context when switching execution from the first portion of software to a second portion of software.

In at least one embodiment, one of the secure processors is configured to request a second context swap from a third context to a fourth context when switching execution from a third portion of software to a fourth portion of software.

In at least one embodiment, the second portion and the fourth portion of software are substantially similar.

Another embodiment comprises a method for executing software in a secure operating environment upon receiving a request to swap to a context for a portion of software. The method includes loading a trust vector descriptor configured for use in controlling a processor's operation and resetting the processor.

In at least one embodiment, the trust vector descriptor defines access by the processor to one or more peripheral devices, and a trust vector verifier controls access by the processor to the one or more peripheral devices.

In at least one embodiment, the trust vector descriptor comprises a bitmap.

In at least one embodiment, the method further includes authenticating a portion of software.

In at least one embodiment, the authenticating operation includes generating a hash of the portion of software, signing the generated hash to create a calculated signature, retrieving a reference signature and comparing the reference signature and the calculated signature. If the signatures are the same, then the method further includes allowing execution of the portion of the software.

In at least one embodiment, the method includes waiting a period of time and performing a second authentication of the portion of software.

In at least one embodiment, the second authentication occurs when the software authenticating is continuous.

In at least one embodiment, the method includes receiving a resource request from the secure processor and determining whether the resource request conforms to the trust vector descriptor. If the resource request does not conform to the trust vector descriptor then the method includes triggering a security exception and resetting the secure processor.

In at least one embodiment, the method further includes determining whether the security exception is a second security exception. If the security exception is not a second security exception, then the method includes waiting a period of time before resetting the secure processor. If the security exception is a second security exception, then the method further includes resetting the secure processor without waiting the period of time.

One embodiment is an apparatus that includes a secure processor configured to request a context swap to a context for a portion of software and authenticate the portion of software by generating a hash of the portion of software. The secure processor is further configured to sign the generated hash to create a calculated signature, retrieve a reference signature and compare the reference signature and the calculated signature. If the signatures are the same, then the secure processor allows execution of the portion of the software. The apparatus also includes a context manager configured to receive the requested context swap, load a trust vector descriptor in a trust vector verifier and reset the secure processor. The apparatus also includes a trust vector verifier configured to receive a resource request from the secure processor and determine if the resource request conforms to the trust vector descriptor. The trust vector verifier is also configured to trigger a security exception if the resource request does not conform to the trust vector descriptor and determine if the security exception is a second security exception. The trust vector verifier waits a period of time before resetting the secure processor if the security exception is not a second security exception. However, the trust vector verifier resets the secure processor without waiting the period of time if the security exception is a second security exception.

Another embodiment comprises a computer readable medium with an encoded data structure that executes on a computer system for controlling the execution of a secure processor. The data structure comprises one or more contexts, with each context comprising a context identification field identifying a context, a memory data region designating secure processor accessible regions of a memory, and a hardware trust vector designating secure processor accessible hardware resources. The computer system is configured to determine whether the secure processor can access a hardware resource based on the hardware trust vector.

In at least one embodiment, the hardware trust vector is a bitmap identifying the type of access allowed for the secure processor.

In at least one embodiment, the data structure includes a code starting address field.

In at least one embodiment, the data structure includes a code ending address field.

In at least one embodiment, the data structure includes a key number field, a target processor field, a vector number field, a scrub type field, a processor boot address field, a trust vector descriptor signature field, and a code signature field.

In at least one embodiment, the code starting address field and the code ending address field define a program memory range for a portion of software executed in the context.

In at least one embodiment, the scrub type field designates whether the authentication of the portion of software is continuous.

Another embodiment is a computer system that comprises a secure processor and a computer readable medium. The computer readable medium includes an encoded data structure with one or more contexts for execution by the secure processor. Each context comprises a context identification field, a hardware trust vector designating which hardware resources the secure processor can access, a code starting address field, a code ending address field and a processor boot address field. The code starting address field and the code ending address field define a program memory range for a portion of software executed in the context. The computer system is configured to determine if the secure processor can access a hardware resource based on the hardware trust vector.

In at least one embodiment, the contexts comprise a target processor field.

Another embodiment comprises a method for protecting a computing system from malicious software. The method includes loading a trust vector descriptor, the trust vector descriptor defining a context. The method further includes receiving malicious software and attempting to execute an instruction in the malicious software. The method further includes recognizing that the instruction is an exception to the context, preventing the instruction from executing and resetting the secure processor.

In at least one embodiment, the method includes receiving a context swap for the malicious software.

In at least one embodiment, the method includes identifying the malicious software.

In at least one embodiment, identifying the malicious software further includes generating a hash of the malicious software, creating a calculated signature from the hash, retrieving a reference signature, and comparing the calculated signature to the reference signature. If the calculated signature and the reference signature are not the same, then the method further includes preventing the instruction from executing.

In at least one embodiment, the method includes identifying the trust vector descriptor.

In at least one embodiment, the instruction is stored in a memory region inaccessible in the context.

In at least one embodiment, the instruction attempts an access of a peripheral device or a memory location which is inaccessible in the context.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

We claim:

1. A method for swapping contexts used to create a secure operating environment, the method comprising:
   receiving a context swap request, wherein the context swap request relates to an active context of a secure hardware processor;
   saving a first context in a first trust vector, wherein the first context comprises the active context on the secure hardware processor at the time that the context swap request is received, and wherein the first context defines a first set of operations that the secure hardware processor is allowed to perform;

resetting the active context within the secure processor, wherein the resetting of the active context comprises setting one or more internal states of the secure hardware processor;

loading a second context from a second trust vector into a second trust vector verifier, wherein the second context defines a second set of operations that the secure hardware processor is allowed to perform; and enabling the second context, wherein the second context is swapped with the first context to become the active context on the secure hardware processor.

2. The method of claim 1, wherein saving the first context comprises:

saving a pointer to a stack;
storing required data in memory; and
performing clean-up functions.

3. The method of claim 1, wherein the context swap request comprises a context ID identifying a context to which to swap.

4. The method of claim 1, wherein the context swap request is sent to the secure hardware processor.

5. The method of claim 1, wherein resetting the secure hardware processor comprises:

erasing data in a secure hardware processor cache;
erasing data in a memory management unit (MMU);
erasing register data;
erasing data in memory; and
purging previous software state data.

6. The method of claim 1, wherein loading a trust vector into a trust vector verifier comprises loading a trust vector descriptor into the trust vector verifier.

7. The method of claim 6, further comprising authenticating the trust vector descriptor.

8. The method of claim 7, wherein authenticating the trust vector descriptor comprises validating a digital signature saved in the trust vector descriptor.

9. The method of claim 7, wherein authenticating the trust vector descriptor is performed before loading the trust vector descriptor into the trust vector verifier.

10. A system for swapping contexts used to create a secure operating environment, the system comprising:

at least one secure hardware processor;
at least one resource; and
memory encoding instructions, that, when executed by the system perform a method comprising:

receiving a context swap request, wherein the context swap request relates to an active context of the secure hardware processor;

saving a first context in a first trust vector, wherein the first context comprises the active context on the secure hardware processor at the time the context swap request is received, and wherein the first context defines a first set of operations that the secure hardware processor is allowed to perform;

resetting the active context within the secure hardware processor, wherein the resetting of the active context comprises setting one or more internal states of the secure hardware processor;

loading a second context from a second trust vector into a second trust vector verifier, wherein the second context defines a second set of operations that the secure hardware processor is allowed to perform;

enabling the second context, wherein the second context is swapped with the first context to become the active context on the secure hardware processor;

using a portion of software with the active context;
receiving a resource request;
comparing the resource request to an active trust vector descriptor;

determining if the request is permitted by the active trust vector descriptor;

when the resource request is permitted by the active trust vector descriptor, allowing communication between the secure hardware processor and the at least one resource; and when the resource request is not permitted by the active trust vector descriptor, triggering a security exception.

11. The system of claim 10, wherein the resource request is sent to the secure hardware processor.

12. The system of claim 10, wherein comparing the resource request to the active trust vector descriptor comprises comparing a requested memory address to a list of authorized memory data regions in the active trust vector descriptor.

13. The system of claim 10, wherein allowing communication between the secure hardware processor and the resource comprises passing the resource request to the resource.

14. The system of claim 10, wherein the security exception resets the secure hardware processor.

15. The system of claim 10, wherein triggering a security exception comprises sending a hardware interrupt to the secure hardware processor.

16. The system of claim 10, wherein triggering a security exception comprises sending a reset instruction to the secure hardware processor.

17. The system of claim 10, wherein the method further comprises resetting a chipset in response to triggering the security exception.

18. The system of claim 10, wherein the method further comprises:

determining if the security exception is a second incidence of a security exception;

when the security exception is not the second incidence of a security exception, performing the steps comprising:
alerting the secure hardware processor so that it will be reset after a period of time;
waiting for the period of time; and
after expiration of the period of time, resetting the secure hardware processor.

19. A method for swapping contexts used to create a secure operating environment, the method comprising:

receiving a context swap request;

in response to receiving the context swap request, saving a first context, wherein the first context comprises a first active context on the secure processor, and wherein the first active context defines a first set of resources that the secure processor is allowed to access;

resetting the first active context within the secure processor;

loading a trust vector into a trust vector verifier, wherein the trust vector comprises a second context, and wherein the second context defines a second set of resources that the secure processor is allowed to access;

authenticating the trust vector descriptor;

enabling the second context, wherein the second context is swapped with the first context to become a second active context on the secure processor; and using a portion of software with the second active context, wherein the second active context limits a capability of the portion of software to access a resource outside the boundaries of the operating system.

20. The method of claim 19, wherein authenticating the trust vector descriptor comprises validating a digital signature saved in the trust vector descriptor.

* * * * *